United States Patent [19]
Davis et al.

[11] Patent Number: 5,835,486
[45] Date of Patent: Nov. 10, 1998

[54] MULTI-CHANNEL TRANSCODER RATE ADAPTER HAVING LOW DELAY AND INTEGRAL ECHO CANCELLATION

[75] Inventors: James M. Davis, Germantown; James D. Pruett, Oakland, both of Tenn.

[73] Assignee: DSC/Celcore, Inc., Plano, Tex.

[21] Appl. No.: 678,254

[22] Filed: Jul. 11, 1996

[51] Int. Cl.$^6$ ........................................... H09B 3/23
[52] U.S. Cl. .................... 370/287; 370/292; 370/347; 370/468; 370/914; 370/545; 379/410
[58] Field of Search .................... 370/276, 282, 370/286, 291, 464, 465, 468, 525, 526; 375/219, 222, 377; 379/406, 410, 411, 399, 230; 37/914, 287, 292, 347

[56] References Cited

U.S. PATENT DOCUMENTS

| | | | |
|---|---|---|---|
| 4,697,261 | 9/1987 | Wang et al. | 370/289 |
| 5,005,168 | 4/1991 | Cummiskey et al. | 370/276 |
| 5,227,987 | 7/1993 | Imazawa et al. | 364/736.04 |
| 5,299,198 | 3/1994 | Kay et al. | 370/347 |
| 5,307,405 | 4/1994 | Sih | 370/410 |
| 5,384,807 | 1/1995 | Yatim et al. | 370/525 |
| 5,400,394 | 3/1995 | Raman et al. | 370/290 |
| 5,430,724 | 7/1995 | Fall et al. | 370/337 |
| 5,430,774 | 7/1995 | Dupuy | 370/350 |
| 5,436,900 | 7/1995 | Hammar et al. | 370/472 |
| 5,438,569 | 8/1995 | Kapadia et al. | 370/463 |
| 5,537,410 | 7/1996 | Li | 370/465 |
| 5,604,740 | 2/1997 | Pinault et al. | 370/463 |

*Primary Examiner*—Douglas W. Olms
*Assistant Examiner*—Seema S. Rao
*Attorney, Agent, or Firm*—Kenyon & Kenyon

[57] ABSTRACT

A multi-channel transcoder with rate adapter converts the data rate of GSM and PSTN network data in a multi-channel network. A transcoder having echo-cancellation features uses the robust voice activity detection functions of the GSM transcoder functions to enhance the accuracy of echo-cancellation of near-end signals. A method for decoding a GSM signal in which the transmission of the audio data over the network is commenced prior to the completing of the decoding process. A transcoder unit having rate adaption and echo-cancellation with improved decoding is implemented in a single DSP and processes multiple traffic channels simultaneously.

10 Claims, 15 Drawing Sheets

MULTI-CHANNEL TRANSCODER RATE ADAPTER HAVING LOW DELAY AND INTEGRAL ECHO CANCELLATION

FIELD OF THE INVENTION

The present invention relates to a transcoder for a mobile communication system. More particularly, the present invention relates to a multi-channel transcoder rate adapter having an integrated echo cancellation function.

BACKGROUND INFORMATION

Mobile digital communication systems, particularly systems using the Group Special Mobile (GSM) standard, require various interfacing devices to connect a "far-end" mobile unit, for example a cellular mobile phone, to a "near-end" network, for example a land-based Public Switched Telephone Network (PSTN). A typical mobile system, as depicted in FIG. 1, includes a collection of mobile units 103 that communicate multiple channels of voice data via known radio carrier methods through an area 104 having a collection of base transceiver systems (BTS) 102 deployed at preselected geographic locations. The BTS's 102 are in turn connected via, for example, Abis lines 107 to a mobile switching center (MSC) 101 that coordinates the various signals being transmitted to and from the base stations. The MSC 101 is further connected to at least one echo-canceller 108 (explained further below) via at least one standard 64 Kbps PCM line 109. The echo-canceller 108 is then connected to the PSTN 105 via, for example, at least one standard 64 Kbps PCM trunk line 106.

In order to maximize the bandwidth available to the GSM network and to ensure the reliability of transmitted signals, data transmitted over the GSM network is encoded prior to radio transmission, and then decoded upon reception. This encoding/decoding process is accomplished through the use of transcoders located, for example, in the MSC 101 and the mobile unit 103. The functional architecture of a conventional GSM transcoder processing a single traffic channel is shown in FIG. 2. The transcoder 200 would be located, for example, at both the MSC 101 and each mobile unit 103 in order to provide encoding and decoding functions at both "ends" of the network. The transcoder 200 can be functionally divided into a transmit handler 201 (also known as a TxDtx handler) and a receive handler 202 (also known as an RxDtx handler).

Typically, the TxDtx handler 201 includes a voice activity detector (VAD) 203, a speech encoder 205, a comfort noise generator 207, and discontinuous transmission (DTX) control unit 209. In operation, digital data, for example digitized speech, is received by the speech encoder 205 as well as the VAD 203. The speech encoder 205 performs an encoding function on the speech data (for example, the encoding functions specified by GSM Specification 6.10) and sends the encoded data to the transmit DTX control unit 209. The VAD 203 concurrently analyzes the speech data and determines whether speech data is actually present or whether the data represents silence (such as a pause between speech). The VAD 203 then either clears or sets a VAD flag bit (VAD bit), depending on whether speech is present (clear) or not present (set). The VAD bit is sent to the Transmit DTX control unit 209.

If the VAD bit is not set, the transmit DTX control unit 209 causes the TxDtx handler 201 to output, for example, the encoded speech bits and a Speech Present flag bit (SP bit) at a set level, indicating the presence of speech in the data stream. If the VAD flag bit is set, however, the transmit DTX control unit 209 causes the TxDtx handler 201 to output a "comfort noise" signal (generated by the comfort noise generator 207). As is known in the art, comfort noise is a lower bandwidth representation of the silence between speech. The GSM Specification uses comfort noise to reduce the bandwidth needed to implement mobile communication. Thus, when no speech is present, the TxDtx handler 201 will output the comfort noise signal as well as the SP bit at a reset level to indicate the presence of comfort noise in the data path.

Also as shown in FIG. 2, the RxDtx handler 202 has an analogous structure to the TxDtx handler 201. Included in the RxDtx handler 202 are a speech decoder 204, a comfort noise decoder 206, and a receive DTX control unit 210. The input received by the receive DTX control unit 210 includes, for example, speech data bits, a silence descriptor flag bit (SID bit), and six time alignment bits (C-bits). If the SID bit is set (indicating comfort noise data in the data stream), the receive DTX control unit 210 diverts the speech data to the comfort noise decoder 206, which appropriately decodes the data. If the SID bit is not set (and the other transmitted flag bits are also not set), the speech data is sent to the speech decoder 204, where the data is decoded using a decoding function, for example the decoding function specified in GSM Specification 6.10.

The six C-bits (e.g., C6–C11) are used for "time-alignment." This adjustment is used to optimize the audio delay in the radio path. As described in the GSM specification, the bits C6–C11 force the decoder function to speed up or slow down in increments of 250 $\mu$s while the encoder function runs at a constant rate. The GSM specification also states that the encoding function and decoding function in the transcoder should not be synchronized. This allows for what is called "slew," where the long term rate of encoder and decoder messages is slightly different by the "slew" amount.

Due to the relatively slow data transmission rate used by GSM traffic channels (e.g., 16 Kbps) in comparison to the transmission rate of a PSTN trunk line (e.g., 64 Kbps), rate adaption is required to convert the GSM data received from or transmitted to the PSTN to the appropriate speed. Such known rate adapters have been implemented, for example, using digital signal processors (DSPs) to perform this rate conversion function. However, it has heretofore not been possible to handle more than one traffic channel in a single DSP rate adapter implementation together with transcoding functions due to, in part, the processing limitations of DSP technology. In a GSM mobile system where, for example, multiple channels are implemented, reduction of the number of DSPs needed to perform transcoding and rate adaption is advantageous to minimize system cost, physical size, and complexity.

An additional problem experienced in mobile telephony is signal echo, i.e. the reception of a previously transmitted signal due to reflection somewhere along the transmission path. Signal echo is not unique to mobile communications as any transmission network will experience echo where an impedance mismatch exists. However, mobile communication systems are highly susceptible to echo effects due to the signal delay inherent in the many signal processing functions performed along the transmission pathway. Echo effects are generally imperceptible to the human ear where the round trip transmission delay of the echo signal is less than 25 milliseconds. However, where the delay between the original transmission and the echo signal is of greater duration, the speaker/listener will be able to detect the echo, making conversation irritating. Mobile systems generally incur delays well over 25 milliseconds.

To combat echo, typical mobile telephone systems employ separate devices, known as echo-cancellers, added at the near-end (e.g. the PSTN end) of the mobile network. These separate devices, which can be implemented using DSPs, detect the presence of echo and filter the echo from received signals. A typical configuration for such an echo-canceller is depicted in the block diagram of FIG. 3. Although the operation of the echo-canceller shown in FIG. 3 is known in the art, the following summary explanation of the operation of a conventional echo-canceller is provided. A more detailed description of prior art echo-cancellers can be found, for example, in D. G. Messerschmitt, "Echo Cancellation in Speech and Data Transmission", *IEEE Journal on Selected Topics in Communications*, SAC-2, No.2, 283–303 (March 1984), which is expressly incorporated by reference.

The echo-canceller operates by first performing an adaptation process (also known as "training") to optimize the echo cancellation filters. As is illustrated by FIG. 3, Block 301 converts an 8 bit $\mu$-law reference signal 310 (for example, the far-end speech data) to a 14 bit linear signal. Block 302 saves the most recent 128 reference samples in a FIFO, and outputs a far-end reference signal y(i). The transversal filter of block 303 perform a convolution of the far-end reference signal y(i) and the filter coefficients a(k) stored in block 305. Thus, block 303 creates signal est(i) which is the estimate of an echo signal s(i). For example, this convolution can be expressed as:

$$est(i) = \text{summation for } k=0\ldots N-1 \text{ of } \{a(k)*y(i-k)\}$$

The coefficients a(k) are adjusted, for example, using the LMS algorithm implemented in blocks 304 and 305 as follows:

$$a(k) = a(k) + 2*G*u(i)*y(i-k),$$

where a(k) are the new updated coefficients of the transversal filter of block 303, u(i) is a filtered signal (described below), y(i–k) are the 128 most recent reference samples, and G is a gain value which controls the speed of the adaptation process.

In order to obtain optimal filter coefficients, a near-end speech detector 306 (NESP) is used to sense whether the near-end person is talking, and to halt the adaptation process when such speech is detected. A "hangover counter" (HCNTR) is set, for example, to the numeric value 600 whenever the following speech detector expression is true:

$$|s(i)| > 0.5*\max\{|y(i)|, |y(i-1)|, \ldots, |y(i-N)|\},$$

where

N is the number of transversal filter coefficients, y(i) are the reference samples, and s(i) is the output from block 308 which creates a 14 bit linear version of an 8 bit $\mu$-law near-end signal (further described below).

HCNTR is decremented to zero, for example, on every 8 KHz sample and the adaptation of the a(k) coefficients resumes when HCNTR=0.

Block 308 receives the near-end signal from, for example, the PSTN, and converts this signal from an 8 bit $\mu$-law signal to a 14 bit linear signal s(i). The error estimate signal est(i) is subtracted from the received signal s(i) to produce a filtered signal u(i). This filtered signal u(i) may still contain some residual echo even after filtration due to inaccuracies in the filter coefficients. Block 307 checks the signal u(i) for the presence of an unacceptable amount of residual echo, according to, for example, the following formulae:

$$Lu(i+1) = 0.99*Lu(i) + 0.01*|u(i)|,$$

$$Ly(i+1) = 0.99*Ly(i) + 0.01*|y(i)|,$$

where Lu(i) is a measure of the long-term energy in u(i), Ly(i) is a measure of the energy in the signal y(i), and û(i)=0 (suppress) whenever Ly(i)/Lu(i)>16 (16 corresponds to 24 db).

Where the residual echo is sizable (i.e. Ly(i)/Lu(i)≦16), the signal u(i) is not altered by block 307, and the completely filtered signal û(i) is set equal to u(i). However, when the echo-canceller output energy is, for example, 24 db below the reference energy, the signal u(i) is assumed to consist entirely of uncancelled echo with no local speech, so the signal u(i) is completely suppressed by block 307 (i.e. û(i)=0). Block 307 is also disabled whenever the NESP 306 detects near-end speech in order to allow this speech to pass through the echo-canceller without filtration.

The completely filtered signal u(i) is then converted from 14 bit linear format to 8 bit $\mu$-law format in block 309, and finally transmitted over, for example, a 64 Kbps PCM line to an MSC.

As described above, conventional echo-cancellers compute the filter parameters by a training process that uses the existing far-end signal from the MSC as the reference signal 310. In a GSM network, however, silence is replaced by comfort noise. Add-on echo-cancellers cannot easily distinguish between comfort noise and actual speech. Thus, an add-on echo-canceller could falsely detect "doubletalk" which slows the training process, thereby reducing performance. It would be advantageous, therefore, to enhance the ability of the echo-canceller to detect such doubletalk.

An additional problem of using such add-on echo-cancellers is that they increase the cost and complexity of the mobile system. As mentioned previously, a single echo-canceller is required for each line connected to the PSTN. Thus, where multiple lines are used in the system, multiple echo-canceller units are required.

As mentioned above, mobile systems experience large amounts of signal delay along the transmission path from the mobile user to the PSTN. This delay is caused by the various signal processing functions performed on the voice signal along the communication path before it reaches its destination. One source of delay is the previously mentioned decoding process performed by transcoders. For example, the GSM Specification requires that a transmission consist of a 20 ms frame of 260 bits of user voice data, comprised of the data illustrated by the following table:

TABLE 1

| Name | Description | No. Of Bits | Bit No. |
|---|---|---|---|
| Sub Frame 1 | Filter Parameters | 36 | b1–b36 |
| | LTP parameters | 9 | b37–b45 |
| | RPE Parameters | 47 | b46–b92 |
| Sub Frame 2 | LTP Parameters | 9 | b93–b101 |
| | RPE Parameters | 47 | b102–b148 |
| Sub Frame 3 | LTP Parameters | 9 | b149–b157 |
| | RPE Parameters | 47 | b158–b204 |
| Sub Frame 4 | LTP Parameters | 9 | b205–b213 |
| | RPE Parameters | 47 | b214–b260 |
| | Total | 260 bits | 20 ms |

As shown in Table 1, each 260 bit frame can be divided into an initial sub-frame of 92 bits and three subsequent sub-frames of 56 bits each. Voice data frames are received by the transcoder unit, which then performs GSM decoding functions, for example those set forth in FIG. 4. The decoded data is output for further processing and ultimate transmission to either the PSTN or the mobile network.

FIG. 4 illustrates the functional elements of a conventional GSM speech decoder, such as speech decoder 204 shown in FIG. 2. The decoder 204 is run once for every 20 ms data frame. Short-term synthesis filter 401 uses bits b1–b36 and an internal signal dp(i) {i=1 . . . 160} to create signal sr(i) {i=1 . . . 160}. RPE grid decoder 402 uses bits b46–b92, b102–b148, b158–b204, and b214–b260 to create an error signal ep(i) {i=1 . . . 160}. Long term synthesis filter 403 is preset using bits b37–b45, b93–b101, b149–b157, b205–b213. The long term synthesis filter 403 then runs 160 times, each time using signal dp(i) {i=1 . . . 160} and creating signal dpp(i) {i=1 . . . 160}. Finally, post-processing block 404, which is a de-emphasis filter, uses signal sr(i) {i=1 . . . 160} and creates signal sro(i) {i=1 . . . 160}. The 160 bits sro(1) to sro(160) are the decoded voice data bits. Blocks 401, 402, 403 and 404, which are well known in the art, are more fully described in GSM Specification 6.10.

As described above, known transcoders utilize decoding units that must wait for the entire 20 ms frame of voice data to be received and decoded by the transcoder prior to beginning the transmission process. It is advantageous, however, to reduce this delay as much as possible in order to reduce echo effects which can degrade the quality of the communication services provided.

SUMMARY OF THE INVENTION

An object of the present invention is to implement a multi-channel transcoder rate adapter in a single DSP. The present invention provides a DSP system having multiple input and output buffers for storing multiple channel audio data. The DSP performs rate adaption through an interrupt-driven routine to place the appropriate channel data onto both the near-end and far-end transmission lines at the appropriate data rate. With the implementation of rate adaption, the DSP also has further processing power available to perform encoding and decoding of the incoming audio data.

A further object of the present invention is to enhance the echo-cancellation capability of a GSM system and to reduce the cost of implementing echo-cancellation in a GSM system. The present invention employs an echo-canceller that uses the already robust voice activity detection bits produced by the transcoder to perform a more accurate filtration of echoed signals. The combination transcoder/echo-canceller can implemented, for example, in a single DSP, which reduces the physical size and cost of the system, particularly where multiple lines are used.

A further object of the present invention is to reduce the delay caused by the GSM decoding process. The method of the present invention decodes a subframe of encoded audio data and places the resulting decoded bits in a transmit queue for transmission over the network. While the transmission of the resulting decoded bits is taking place, the next subframe of audio data is decoded. By initiating transmission of decoded data bits immediately, and not waiting until all the audio data bits have been received and decoded, significant reduction in the delay associated with the decoding process is achieved.

A further object of the present invention is a multi-channel transcoder unit having transcoding, rate adaption, and echo-cancellation functions, and using an improved decoding process, implemented in a single DSP. By scheduling the occurrence of system events into time windows according to the time allowed under the GSM specification, multi-channel operation can be achieved without time delay and within the bandwidth limitations of present DSPs. Additional benefits of reduced system size and cost are also realized.

DETAILED DESCRIPTION OF THE INVENTION

Figure 5:
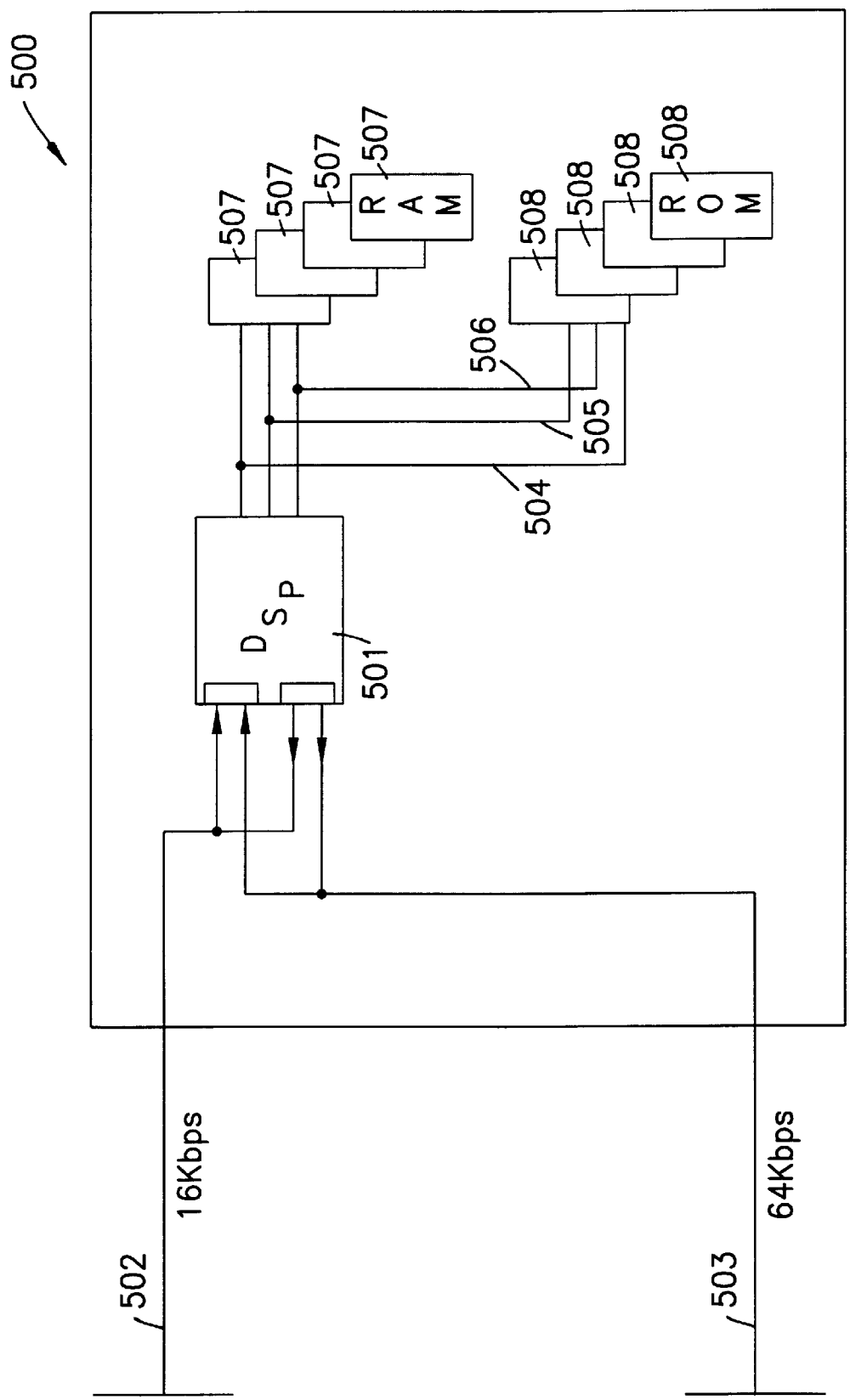
FIG. 5 shows a block diagram of a hardware implementation of a first exemplary embodiment of a transcoder rate adapter according to the present invention.

A block diagram of the hardware configuration for a first exemplary embodiment of a transcoder rate adapter unit (TRAU) according to the present invention is shown in FIG. 5. The TRAU 500 is located, for example, at the MSC of the GSM network, such that the encoding, decoding, and rate adaption functions required at the MSC can be realized.

TRAU 500 includes a single DSP chip 501. The DSP 501 is connected to a 16 Kbps transmission line 502 capable of carrying, for example, 4 traffic channels. The DSP 501 is connected to a 64 Kbps transmission line 503 also capable of carrying, for example, 4 traffic channels. The 16 Kbps transmission line can be, for example, a 16 Kbps Abis line, and the 64 Kbps transmission line can be, for example, a 64 Kbps PCM line. These lines are functionally bidirectional, each transmission line is connected to both an input and output of the DSP 501. The DSP 501 is further connected via an address bus 504, a data bus 505, and a control bus 506 to at least one RAM 507 and at least one a ROM 508 chip, in a conventional manner. The DSP used in this exemplary embodiment can be, for example, an Analog Devices 2106x DSP chip.

Figure 6:
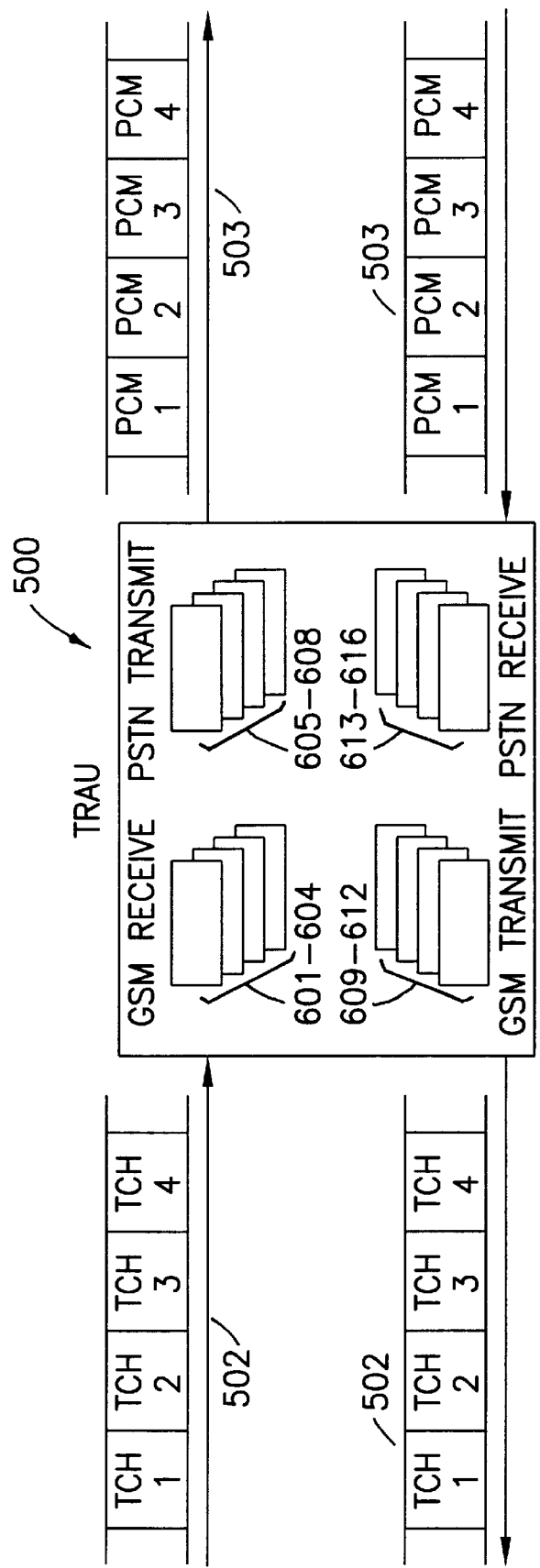
FIG. 6 shows a functional block diagram of multi-channel operation of the transcoder rate adapter according to the present invention.

FIG. 6 is a diagrammatic representation of the multi-channel operation of the TRAU 500 according to the present invention. As previously mentioned, the DSP 501 is connected to the 16 Kbps transmission line 502 and the 64 Kbps transmission line 503. Within the TRAU 500 are buffers for storing the voice data received by the TRAU 500 from these lines: a bank of 4 GSM-receive buffers 601–604; and a bank of 4 PSTN-receive buffers 613–616. Also within the TRAU 500 are buffers for storing voice data that has been processed by the TRAU functional units and is ready for transmission to the PSTN or GSM network: a bank of 4 GSM-transmit buffers 609–612; and a bank of 4 PSTN-transmit buffers 605–608. Each buffer in each bank of four buffers corresponds to an individual traffic channel. Thus, in this exemplary embodiment of the present invention, the TRAU 500 is capable of processing four traffic channels.

Figure 7:
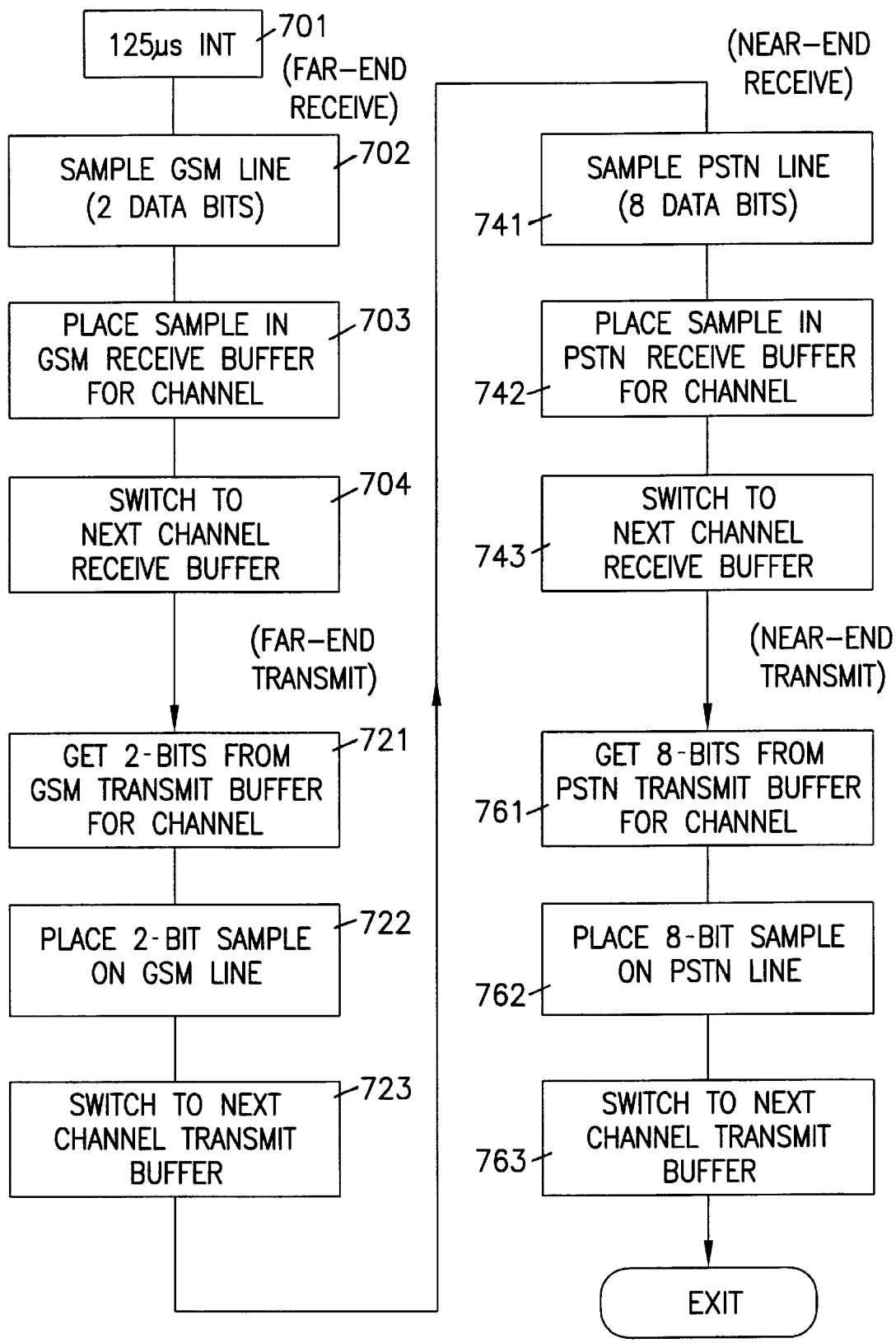
FIG. 7 shows a flow chart of the multi-channel operation of the transcoder rate adapter according to the present invention.

FIG. 7 describes the method steps performed by the DSP 501 in implementing a multi-channel TRAU architecture according to the present invention. The DSP 501 generates an interrupt 701 every, for example, 125 microseconds, to force the initiation of a reception/transmission routine. As a first step 702 of a far-end receive routine, the DSP 501 sequentially samples the 16 Kbps line 502, reading two bits corresponding to one of four possible GSM traffic channels: TCH1; TCH2; TCH3; or TCH4. In step 703, these bits are stored in an appropriate GSM-receive buffer 601–604 corresponding to the sampled traffic channel. Once these two bits have been received in the current channel buffer, step 704 switches the designated GSM-receive buffer to the next channel buffer in preparation for the next execution of the far-end receive routine. The data bits are stored sequentially in the GSM-receive buffers 601–604, so that the information that is read from these buffers by other functional units within the TRAU 500 (such as, for example an RxDtx handler) will coherently represent the transmitted voice data.

A far-end transmit routine is also executed to transmit multi-channel voice data to the far-end network. In step 721, the DSP 501 reads two bits from the appropriate GSM-transmit buffer. In step 722, the DSP 501 places the bits on the 16 Kbps transmission line 502 in a conventional manner. In step 723, the DSP 501 switches to the next channel buffer in preparation for the next execution of the far-end transmit routine.

Routines for transmission to and receipt from the near-end network are also performed, as shown by steps 741–763. For example, in step 761 of the near-end transmit operation, the DSP 501 reads 8 bits of data from one of the PSTN-transmit buffers 605–608 containing voice data corresponding to one of four traffic channels: PCM1; PCM2; PCM3; or PCM4. In step 762, the DSP 501 places this data sequentially on the 64 Kbps transmission line 503 in a conventional manner. In step 763 the DSP 501 switches to a new buffer corresponding to another traffic channel, in preparation for the next near-end transmission sequence. In step 741 of the near-end receive operation, the DSP 501 samples the 64 Kbps transmission line 503 for 8 bits over 125 microseconds. In step 742, the DSP 501 sequentially places the sampled bits in the PSTN-receive buffer corresponding to one of the four traffic channels. In step 743, the DSP 501 switches to another buffer in preparation for the next near-end receive cycle.

Thus, as previously described, the TRAU 500 of first exemplary embodiment of the present invention implements four GSM traffic channels in a single DSP. The resulting TRAU 500 is a single DSP implementation of a complete transcoder and rate adapter, capable of processing multiple traffic channels. Consequently, system size, cost and complexity are significantly reduced.

The four-channel embodiment described above can be achieved while still leaving additional processor bandwidth available for further functional implementations in the DSP. This remaining DSP bandwidth can be utilized, for example, to implement the additional functions needed for echo-cancellation at the MSC end of the network (as is more fully described below).

Figure 8:
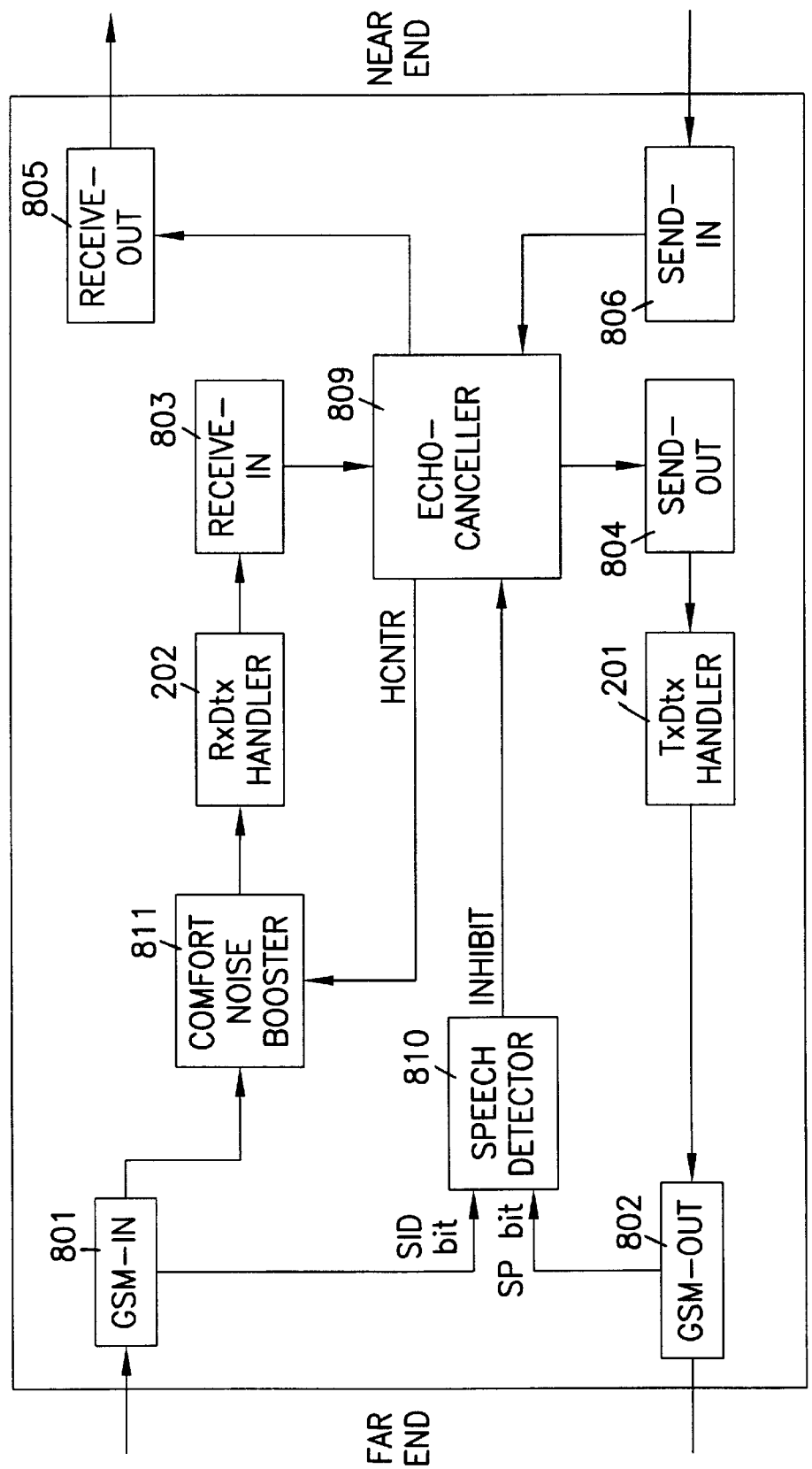
FIG. 8 shows a functional block diagram of a second exemplary embodiment of a transcoder with an integral echo-canceller according to the present invention.

A block diagram of the functional elements of a second exemplary embodiment of the present invention is shown in FIG. 8. This exemplary embodiment implements a transcoder unit having an integrated echo-canceller. These elements may be implemented using conventional hardware components, including DSPs arranged in a conventional manner. The transcoder/echo-canceller unit 800 is located, for example, at the MSC of the GSM network, such that the encoding, decoding, and echo-cancellation functions required by the MSC may be realized.

Figure 1:
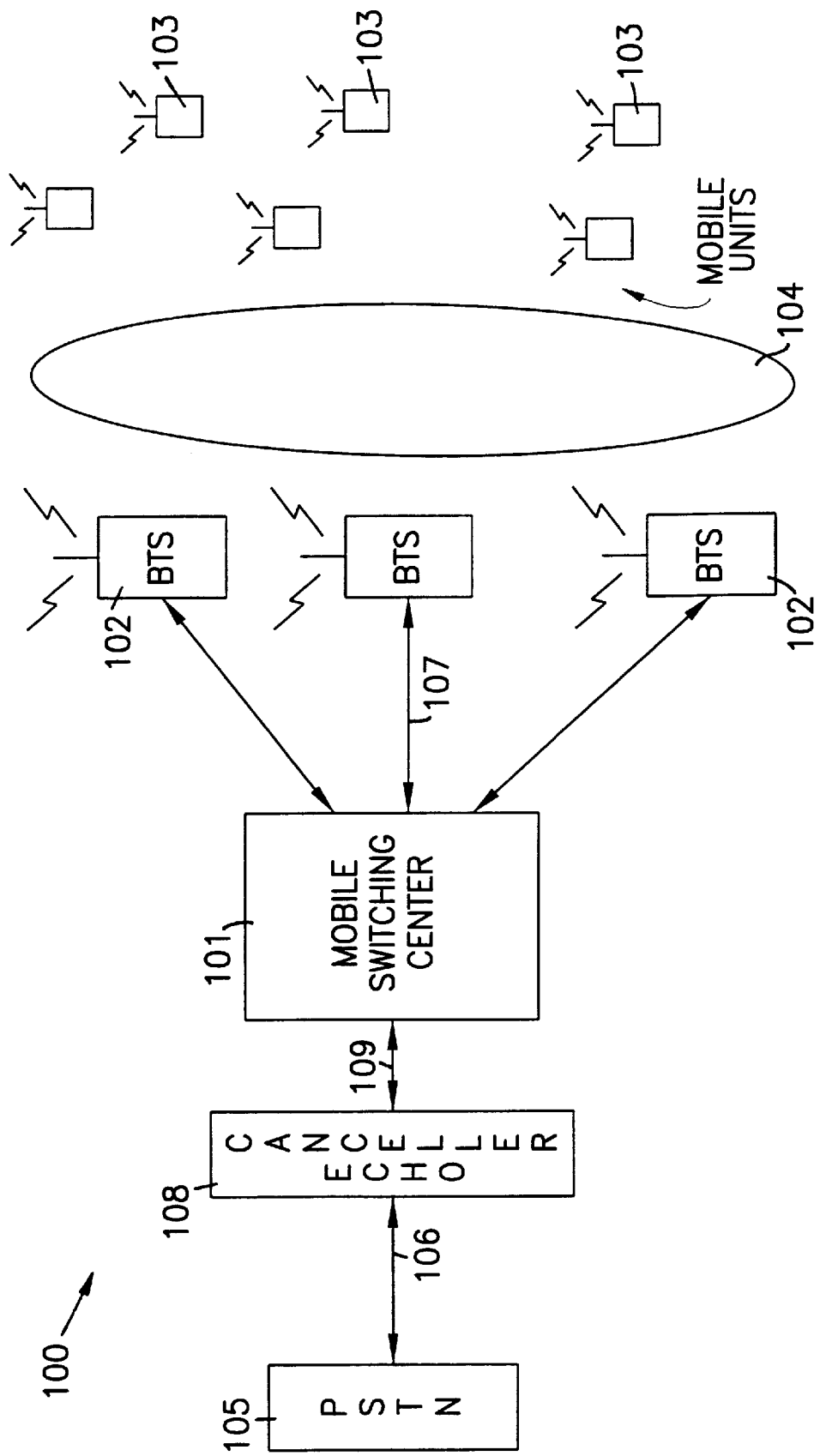
FIG. 1 shows a block diagram of an exemplary cellular mobile telephone systems.
Figure 2:
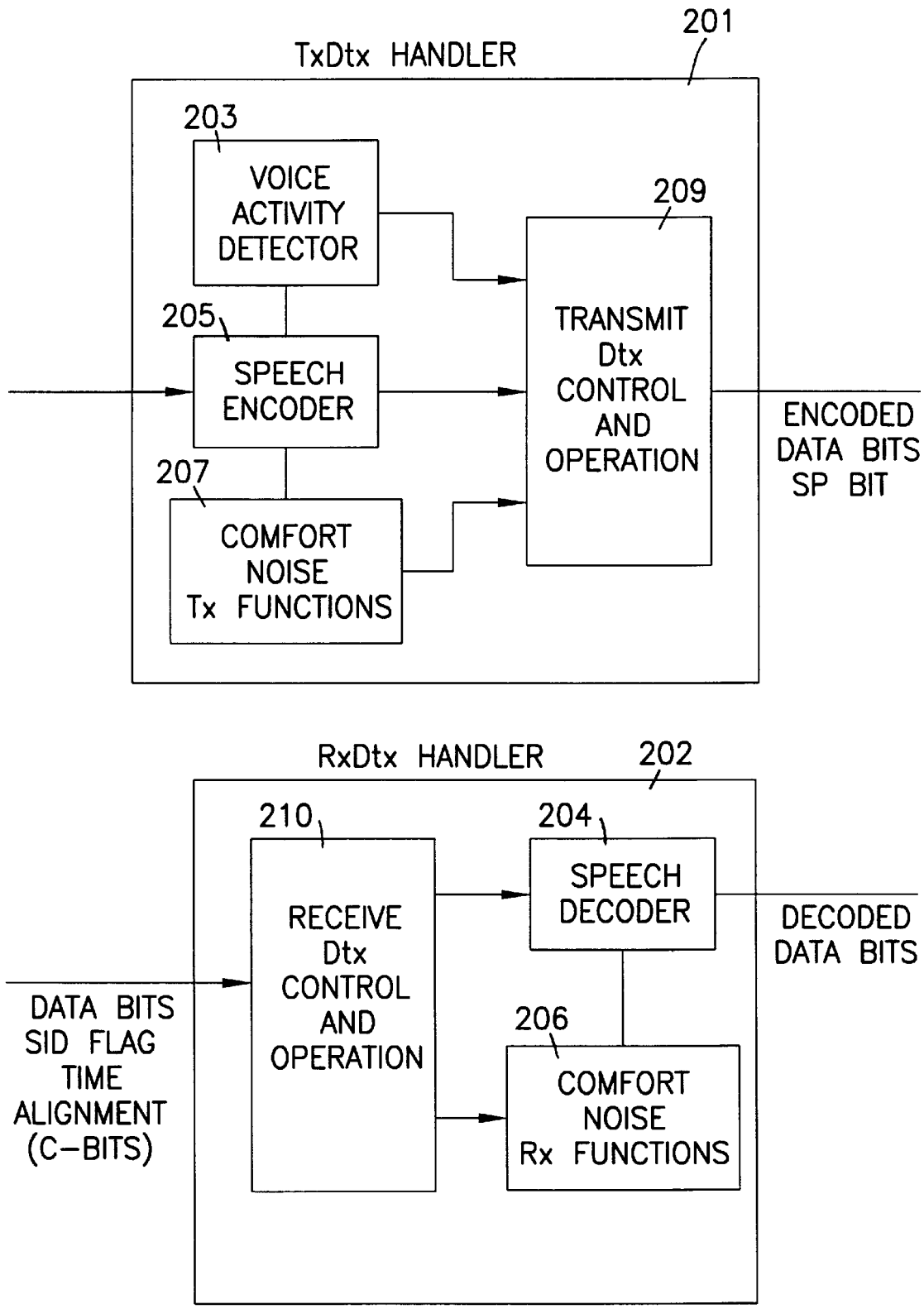
FIG. 2 shows a block diagram of an exemplary conventional GSM transcoder unit.

A GSM-in buffer 801 is connected to the input from the far-end network and can also connect to a comfort noise booster 811, as shown. An RxDtx handler 202 (as previously described in FIG. 2) has an input connected to the comfort noise booster 811 and an output connected to a receive-in buffer 801. A GSM-out buffer 802 has an output connected to the far-end network and has an input connected to an output of a TxDtx handler 201 (as previously described in FIG. 2). Both the GSM-in and GSM-out buffers 801, 802 are further connected to a speech detector 810.

The speech detector 810 has an output connected to an echo-canceller 809. The echo-canceller 809 has an input connected to the receive-in buffer 803 and an output connected to the TxDtx handler 201 via a send-out buffer 804. The echo-canceller 809 also has an output connected to a receive-out buffer 805 and an input connected to a send-in buffer 806. The receive-out and send-in buffers 805, 806 are connected to the near-end network.

In the receive operation of the transcoder/echo-canceller unit 800 according to the present invention, voice data is received by the GSM-in buffer 801 from the far-end network. The voice data received by the GSM-in buffer includes, for example: a plurality of information bits (representing speech bits); the SID bits; the BFI bit; the TAF bit; and the C-bits. After a comfort noise boosting function is performed by the comfort noise booster 811 (described below), the RxDtx handler 202 reads the voice data from the GSM-in buffer 801, performs a decoding function on this data (as previously described) and places the decoded voice data bits in the receive-in buffer 803. The echo-canceller 809 retrieves the decoded voice data bits from the receive-in buffer 803, performs various echo cancellation operations (as described below), and transmits these bits to the receive-out buffer 805. From there, the decoded voice data bits enter the near-end network for transmission to the land-based listener in a conventional manner.

In the transmit operation of the transcoder/echo-canceller unit 800, near-end voice data is received by and stored in the send-in buffer 806. The echo-canceller 809 retrieves this data from the send-in buffer 806 and performs echo-cancellation functions to remove possible echo from the voice data (as described below). The filtered voice data is subsequently placed in the send-out buffer 804, where it can be retrieved by the TxDtx handler 201. The TxDtx handler 201 performs the encoding and voice detection functions on the voice data.

Specifically, if the voice activity detector 203 (see FIG. 2) located in the TxDtx handler 201 determines that the filtered voice data does not contain speech, the SP bit is cleared to indicate the absence of speech, and the comfort noise generator 207 (see FIG. 2) is directed to replace the filtered voice data with comfort noise data. However, if the voice activity detector 203 determines that speech is present in the filtered voice data, the encoder 205 performs an encoding function on the filtered voice data and sets the SP bit. The resulting voice data bits and SP bit are sent to the GSM-out buffer 802, where they will enter the far-end network for transmission to the mobile user in a conventional manner.

Figure 3:
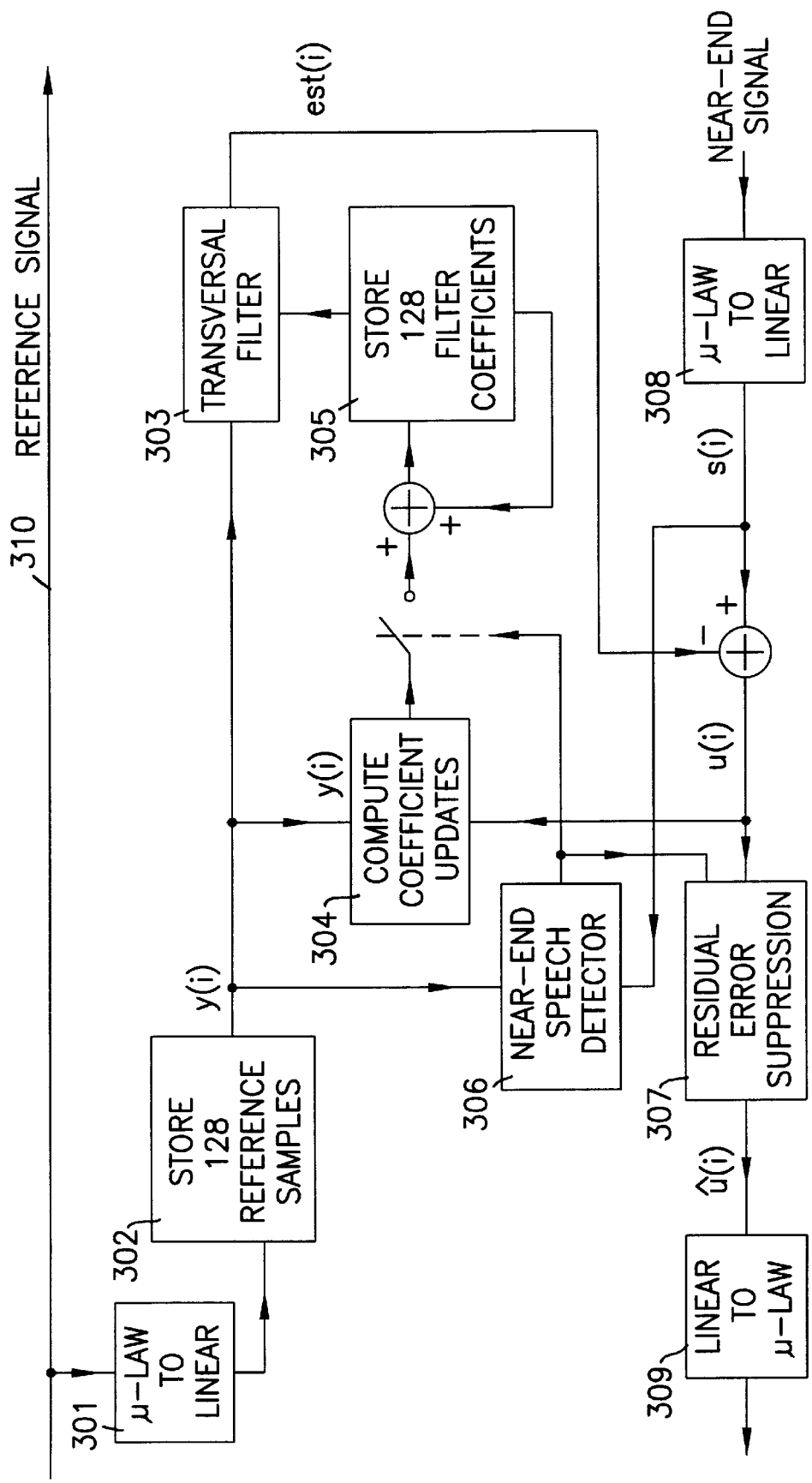
FIG. 3 shows a block diagram of an exemplary conventional add-on echo-canceller.
Figure 9:
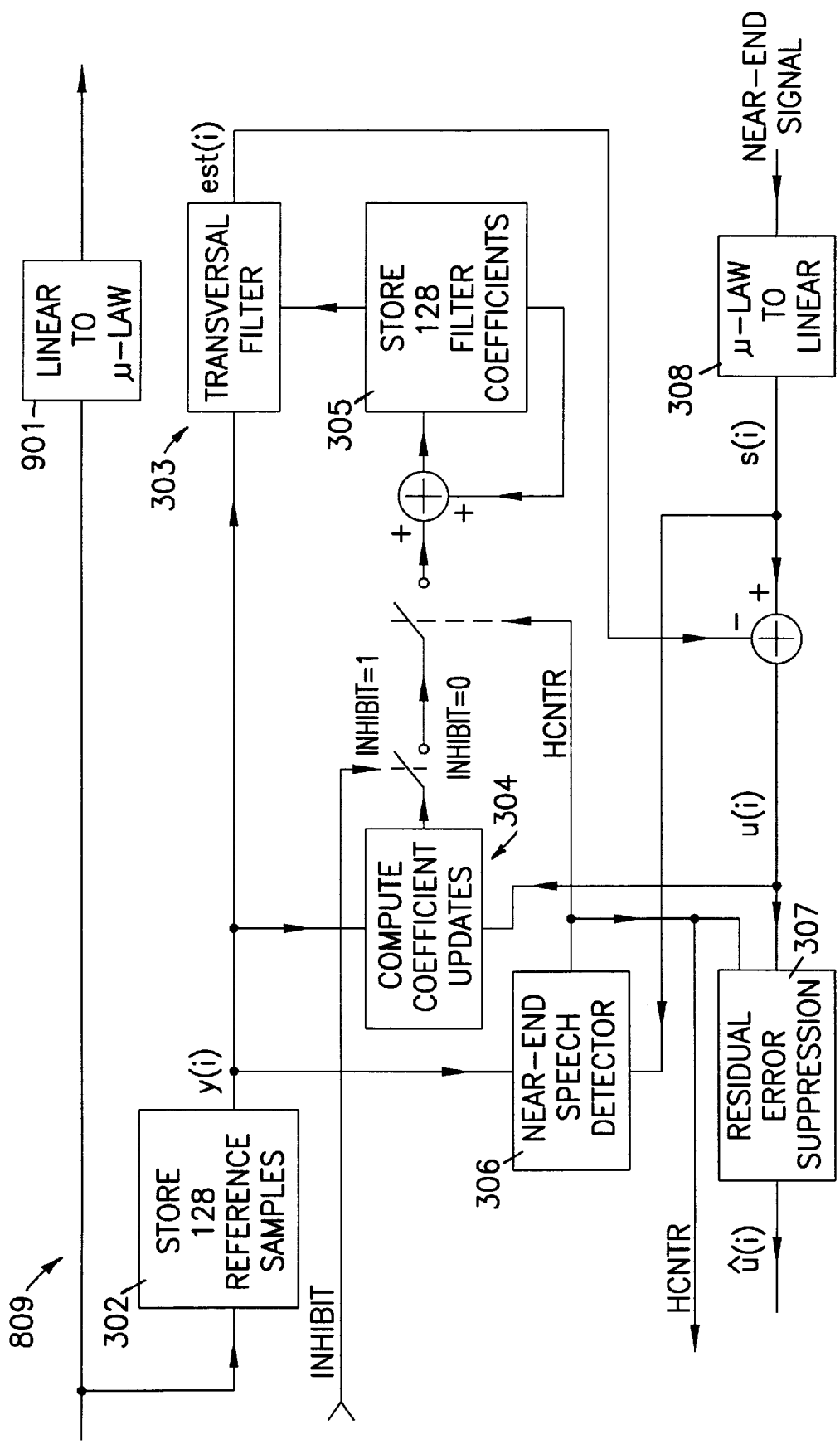
FIG. 9 shows a functional block diagram of the echo cancellation functions of the transcoder with an integral echo-canceller according to the present invention.

The integrated echo-canceller feature of the transcoder/echo-canceller unit 800 according to the present invention shown in FIGS. 8 and 9 implements integrated echo-cancellation through the use of echo-canceller unit 809, speech detector unit 810 and comfort noise booster 811. As shown by FIG. 9, the echo-canceller 809 employs many of the same functional units as the conventional echo-canceller illustrated in FIG. 3. Since the GSM network uses linear audio samples, though, the $\mu$-law to linear converter block 301 and the linear to $\mu$-law converter block 309 are not needed. An additional linear to $\mu$-law converter block 901, however, is needed at the near-end output of the echo-canceller in order to prepare the signal for transmission over, for example, the PSTN. Furthermore, echo-canceller 809 of the present invention uses the signals INHIBIT and HCNTR to achieve a better training than available with conventional echo-cancellers, as will be more fully described below.

As previously described, echo cancellation is achieved through two phases of operation: a training phase; and a filtering phase. The echo-canceller unit 809 determines the appropriate phase of operation based on the level of a signal HCNTR, which is derived in the NESP 306 (FIGS. 3, 9), and a signal INHIBIT which is derived in the speech detector 810 illustrated in FIG. 8. As is already known in the art, the NESP 306 detects the presence of speech-in the near-end data and halts the training process whenever near-end speech is present. The signal HCNTR is produced by the NESP 306 to indicate a halt condition. The present invention also uses the speech detector 810 to detect speech in the data path. The speech detector 810 accesses the SID bits and the SP bit from the GSM-in buffer 801 and the GSM-out buffer 802, respectively, to determine whether speech is present from either the near-end or far-end. When the far-end is quiet (and therefore comfort noise is being produced) and the near-end is talking, the INHIBIT signal is set, signifying that the training phase must be momentarily halted. This can be expressed as, for example:

if (far end is quiet and near end is talking) then don't train.
Or, for example, as a "C" language expression:
if ((SID==1 || SID==2) && SP==1) {INHIBIT=1;} else {INHIBIT=0;}

When INHIBIT is set, this halts the update of the transversal filter coefficients. Thus, the use of the INHIBIT signal in addition to the HCNTR signal improves the training phase by preventing false training when local speech is indeed present. The robust SP and SID bits from the GSM data stream add reliability to the echo-canceller speech detection operation.

As previously described, in the training phase of operation, the echo-canceller 809 trains on the signal being sent by the mobile user. Training provides the parameters for the echo cancellation filters 303 used to filter incoming voice data. When far-end speech is not present, comfort noise is automatically sent from the mobile unit (per the GSM specification). The integrated echo-canceller of the present invention uses this comfort noise signal for training. Since the comfort noise is conditioned to the individual channel, it is not offensive to the near-end listener.

Figure 10:
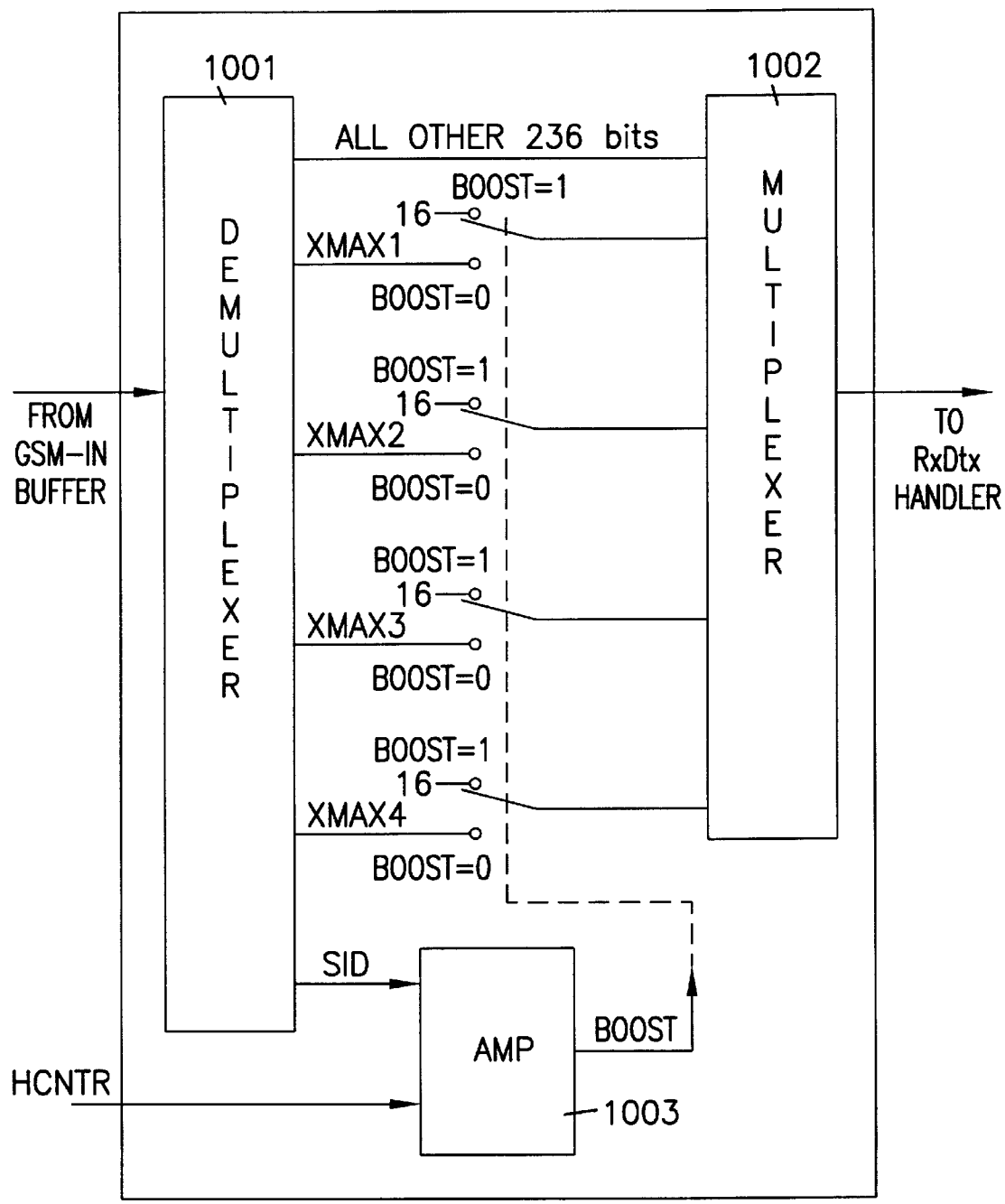
FIG. 10 shows a functional block diagram of a comfort noise booster according to the present invention.

The comfort noise booster 811 is used to amplify the comfort noise signal when needed for training operations. The comfort noise booster 811 is shown in more detail in FIG. 10. Demultiplexer 1001 extracts bits from the 260 bit voice frame corresponding to the amplitude parameters for each subframe (denoted Xmax1–Xmax4). It is then determined in the amplification block 1003 whether a boost is required, according to, for example, the following expression:

if training phase is active and the far-end is sending comfort noise, then amplification is on, else amplification is off.

Or, for example, as a corresponding "C" language expression:

if (HCNTR==0 && SID!=0) {boost=1;} else {boost=0;}.

If it is determined that amplification is needed, each Xmax parameter is set to, for example, a value of 16. Multiplexer 1002 then reinserts the Xmax parameters into the correct locations in the 260 bit data frame.

In the filtering phase of operation, the echo canceller 809 receives the voice data from the near-end network (as stored in the send-in buffer 806) and filters that voice data according to the parameters of the echo cancellation filters 303 set during training. The filtered voice data is subsequently stored in the send-out buffer 804, for later retrieval by the TxDtx handler 201.

As a result of the combination of transcoder and echo-cancellation functions, the transcoder/echo-canceller unit 800 of the present invention exploits the robust GSM speech detection functional units to derive a better training function. The transcoder/echo-canceller unit 800 of the present invention also exploits the comfort noise used by the GSM network to derive a better training.

Figure 11:
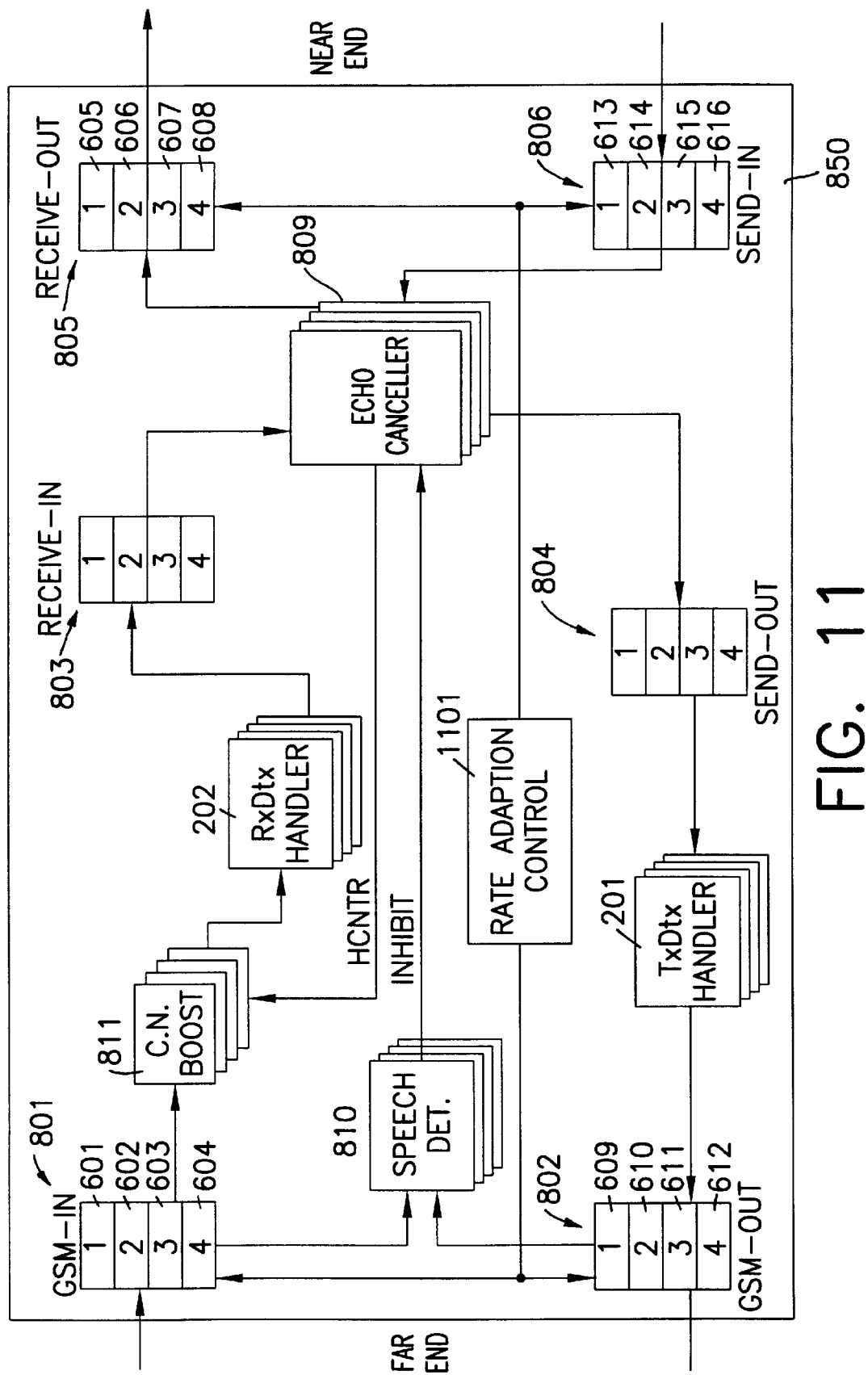
FIG. 11 shows a third exemplary embodiment of a multi-channel transcoder with an integral echo-canceller according to the present invention.

FIG. 11 shows, as a third exemplary embodiment of the present invention, a multi-channel transcoder/rate adapter/echo-canceller (TRAU/EC) 850. The TRAU/EC 850 implements a multi-channel GSM architecture (for example a four channel system) by using multiple transcoder/echo-cancellers 800 (as shown by FIG. 8) in conjunction with the rate-adaption architecture of TRAU 500 (as shown by FIG. 6). Furthermore, the TRAU/EC 850 of this third exemplary embodiment can be implemented in a single DSP chip (for example, in the hardware configuration shown in FIG. 5), using the excess bandwidth remaining after the implementation of rate adaption and transcoding functions.

As shown functionally by FIG. 11, each of the functional units of the transcoder/echo-canceller 800 (shown in FIG. 8) would be implemented four times within the DSP 501 in forming TRAU/EC 850. Rate adaption is achieved using a rate adaption control block 1101 in conjunction with the buffering scheme of FIGS. 6 and 8. Specifically, the GSM-in and GSM-out buffers 801, 802 for the multi-channel TRAU/EC 850 would correspond to the individual GSM-receive and GSM-transmit buffers 601–604, 609–612 for each channel (as shown by FIG. 6). Accordingly, the receive-out and send-in buffers 805, 806 for the multi-channel TRAU/EC 850 would correspond to the individual PSTN-transmit and PSTN-receive buffers 605–608, 613–616 for each channel. The receive-in and send-out buffers 803, 804 are also implemented as four individual buffers corresponding to each traffic channel being serviced. The rate adaption control block 1101 performs, for example, the functions described in the flow chart in FIG. 7. Thus the multi-channel TRAU/EC 850 can provide full transcoding, rate adaption, and optimized echo-cancellation functions over multiple traffic channels, all implemented in a single DSP system.

A fourth exemplary embodiment of the present invention is an optimized decoding method implemented in a decoding unit for use in an RxDtx handler (such as RxDtx Handler 202 (see FIG. 2)). The decoding method of this fourth exemplary embodiment of the present invention uses, for example, four subdecoding units to process each 20 ms frame of data to be decoded. As will be further explained below, each subdecoder operates on a different subframe of speech data, producing 40 samples of decoded voice data, which can be sent to an appropriate buffer for immediate transmission without the need to wait for the completion of the decoding being performed by other subdecoders. Since the method of the present invention relates to decoding of GSM data, it can be implemented in the transcoder at, for example, both the MSC and mobile unit ends of the network.

Figure 12:
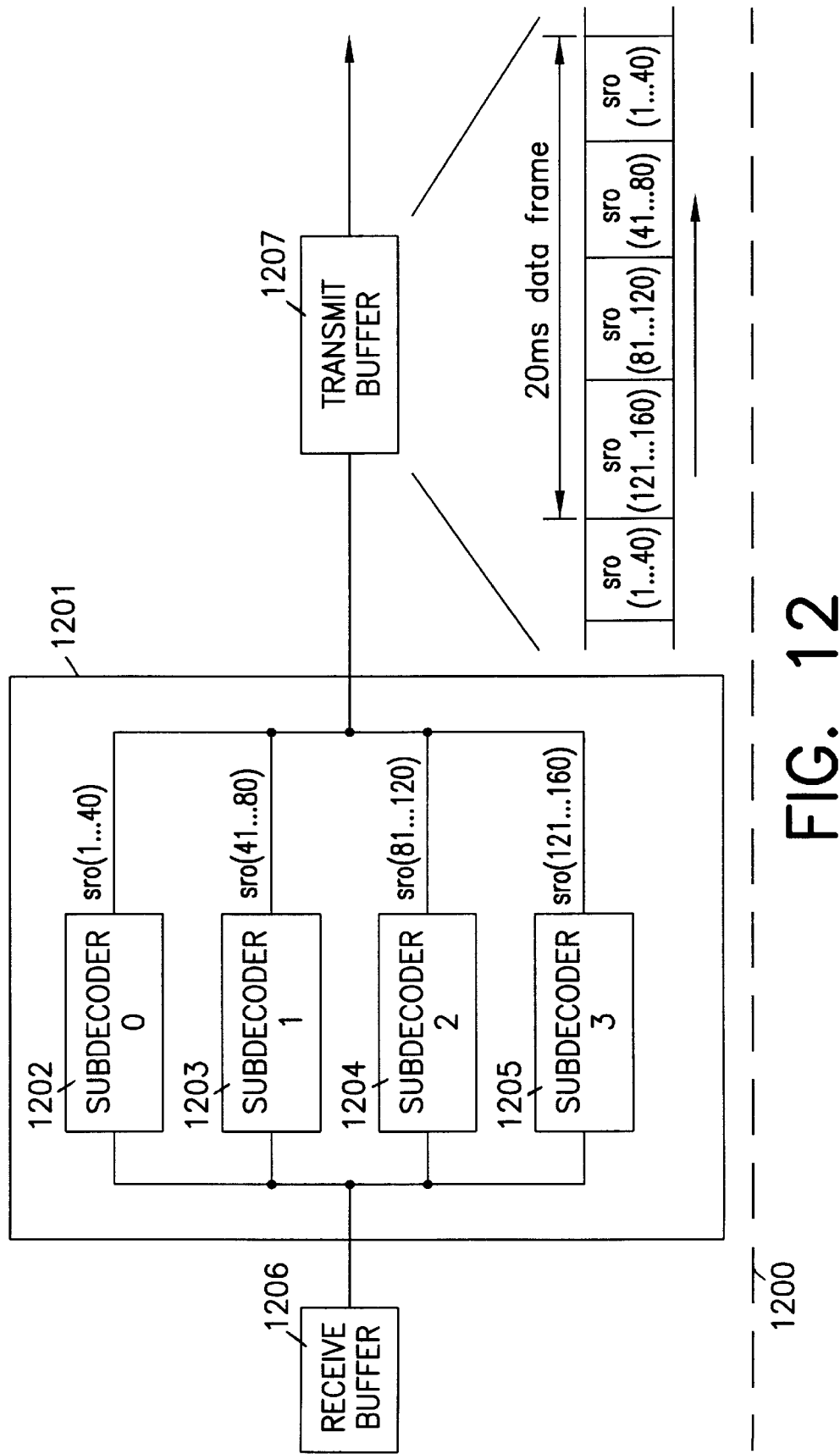
FIG. 12 shows a functional block diagram of the decoding unit of a fourth exemplary embodiment of the present invention.
Figure 13A:
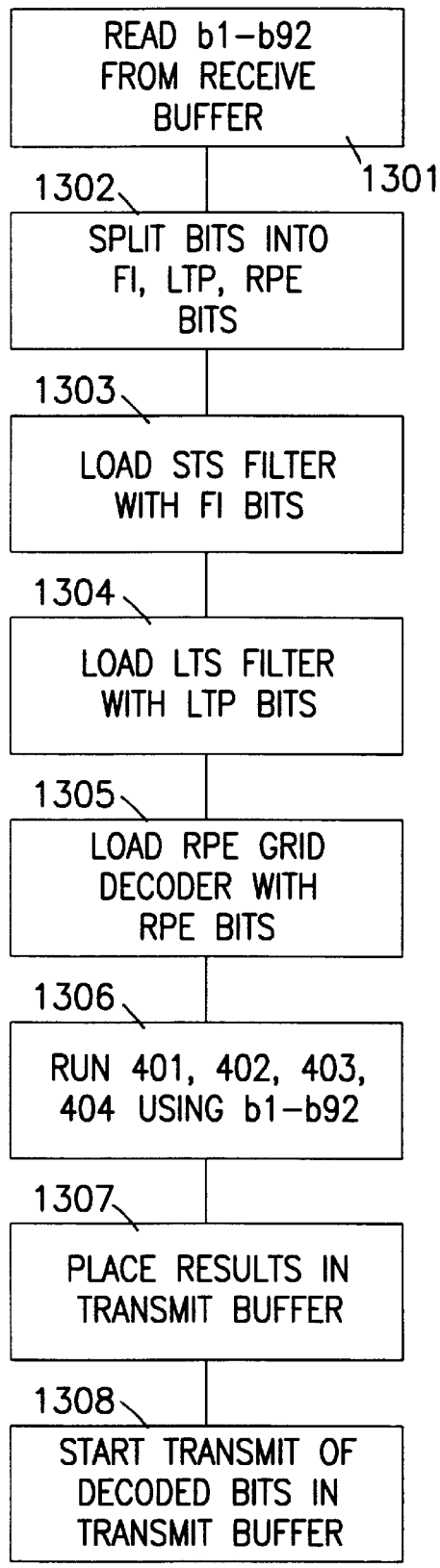
FIG. 13a shows a flow chart of the decoding process for a first subdecoder according to the present invention.
Figure 13B:
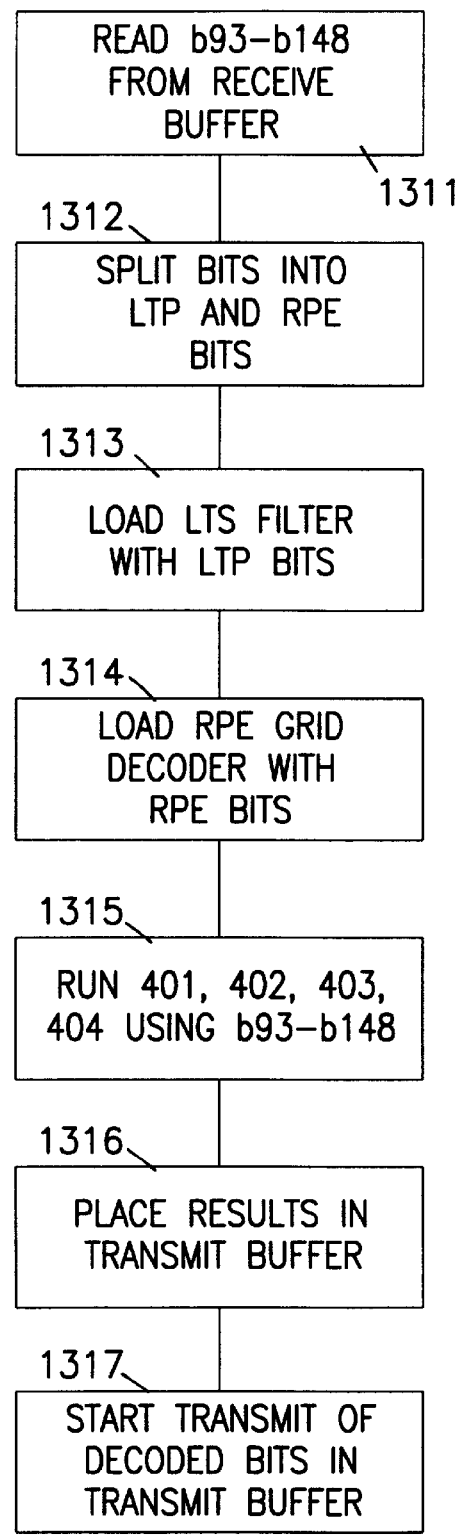
FIG. 13b shows a flow chart of the decoding process for a second subdecoder according to the present invention.
Figure 13C:
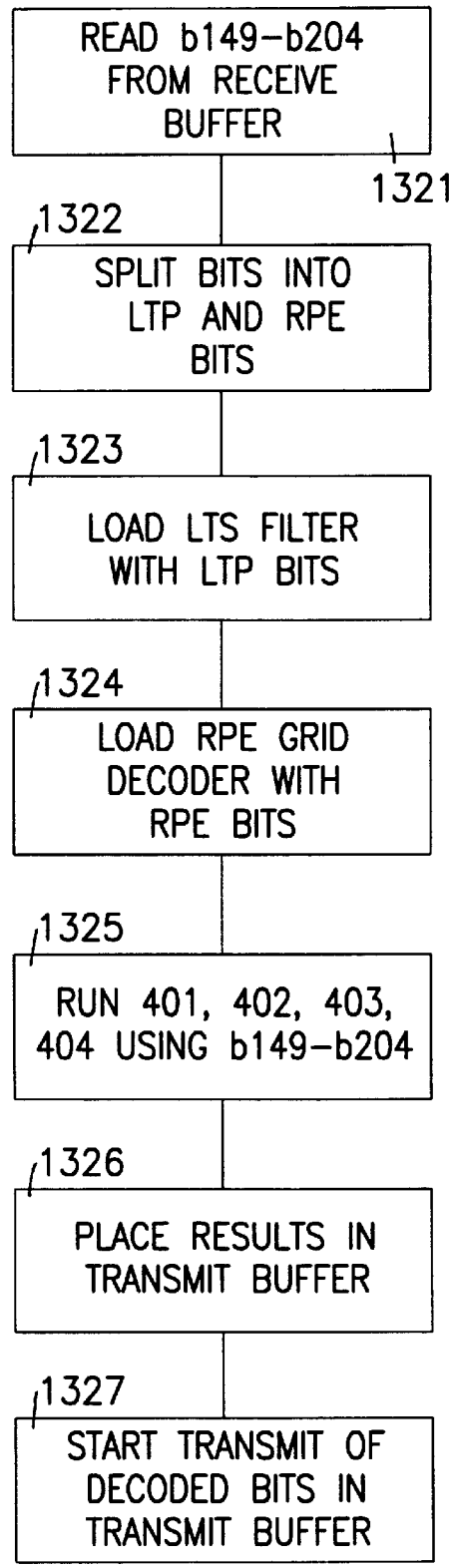
FIG. 13c shows a flow chart of the decoding process for a third subdecoder according to the present invention.
Figure 13D:
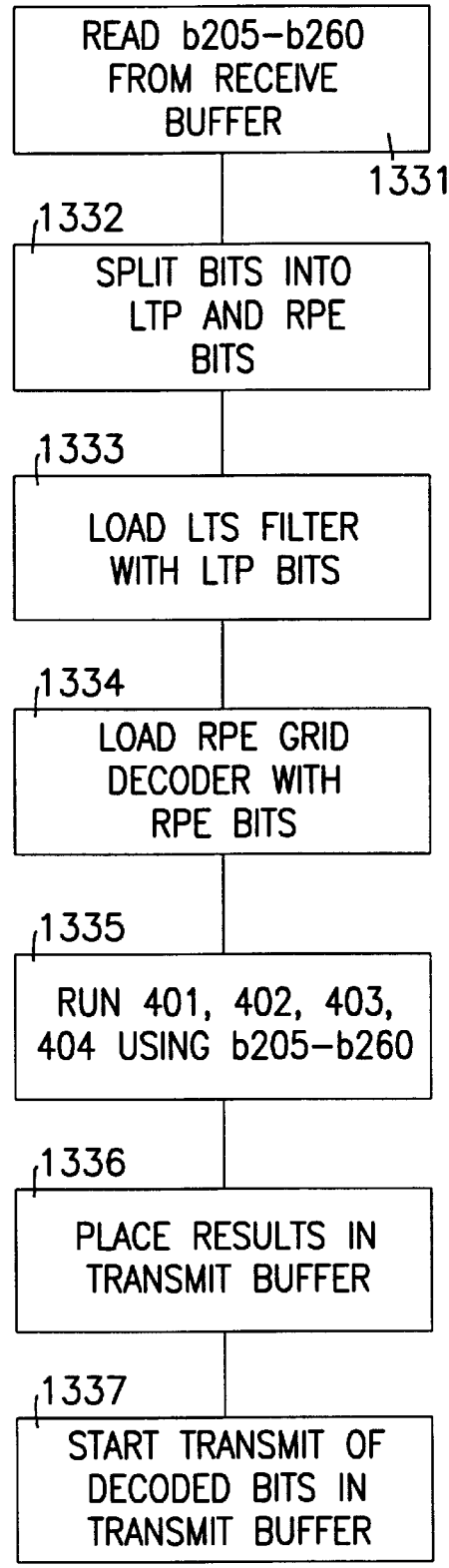
FIG. 13d shows a flow chart of the decoding process for a fourth subdecoder according to the present invention.

As shown by FIG. 12, a decoder unit 1201 is implemented within a transcoder 1200 using four subdecoder units: Subdecoder0 1202; Subdecoder1 1203; Subdecoder2 1204; and Subdecoder3 1205. The decoder unit 1201 receives encoded digital voice data, for example a 260-bit GSM voice data frame, from a data source (not shown). Since the decoder unit 1201 can be used in both a near-end and the far-end transcoder, the data source could be either a near-end or a far-end user. The data source can be interfaced by using, for example, a receive buffer 1206. The receive buffer 1206 is connected to the decoder unit 1201, so that the subdecoders 1202–1205 can read the voice data bits from the receive buffer 1206. The output of the decoder unit 1201 is connected to, for example, a transmit buffer 1207, which can act as an interface between the decoder unit 1201 and the subsequent functional units of the transcoder 1200 (e.g. a DTX controller (see FIG. 2)) or the destination network.

Figure 4:
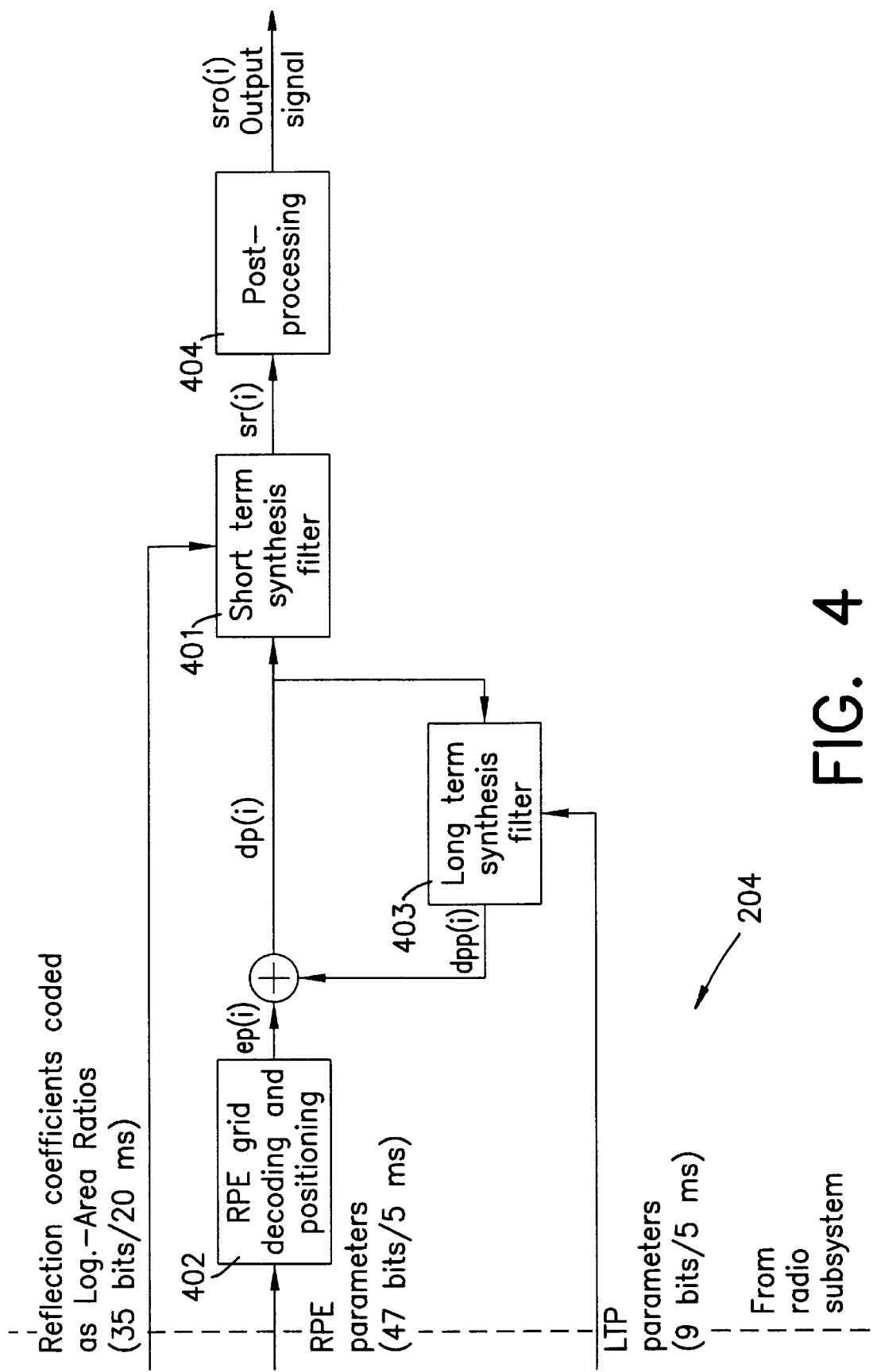
FIG. 4 shows a functional block diagram of conventional GSM decoding functions according to the GSM Specification.

FIGS. 13a–13d show the operation of the decoding process according to the present invention. As shown by step 1301 in FIG. 13a, Subdecoder0 1202 reads the first 92 bits of the digital voice data frame from the receive buffer 1206. In step 1302, these bits are split into three groups: Filter Initialization bits; LTP bits for subframe 1; and RPE bits for subframe 1 (described in Table 1). In step 1303, the bits b1–b36 are input into the short term synthesis filter 401 for use over the entire 20 ms frame by all four subdecoders. In step 1304, the bits b37–b45 are sent to the long term synthesis filter 403, and in step 1305 the bits b46–b92 are sent to the RPE grid decoder 402. In step 1306, the GSM decoding operations—short term synthesis filtering, long term synthesis filtering, RPE grid decoding and positioning, and post-processing—are then performed on the subframe, according to the same methods as described in FIG. 4. The product of the decoding process of subdecoder0 1202 are the bits sro(i) $\{i=1 \ldots 40\}$, which represent the first 40 bits of decoded voice data. In step 1307, these 40 bits are stored in transmit buffer 1207. Transmission of these 40 bits over the destination network may now begin (step 1308).

Once subdecoder0 1202 has sent the first 40 decoded bits to the transmit buffer 1207, subdecoder1 1203 begins decoding the next 56 bits of the data frame. Accordingly, in step 1311, bits b93–b148 are read from the receive buffer 1206, and in step 1312, split into LTP parameter bits and RPE parameter bits. Since the Filter Initialization bits have already been set (during the execution of subdecoder0 1202), these bits need not be altered. The long term synthesis filter 403 is next loaded with the LTP parameter bits (step 1313) and the RPE grid decoder 402 is loaded with the RPE parameter bits (step 1314). In step 1315, the decoding functions 401–404 are run using the bits b93–b148, producing the 40 sampled bits sro(i) $\{i=41 \ldots 80\}$. In step 1316, these 40 decoded samples are then sent to the transmit buffer 1207 in the same fashion as for subdecoder0 1202, where, in step 1317, transmission of these bits may begin.

Subdecoder2 1204 and subdecoder3 1205 are similar to subdecoder1 1203, except that in subdecoder2, the bits b149–b204 are retrieved from the receive buffer 1206 and operated on in a manner similar to subdecoder1, and in subdecoder3 the bits b205–260 are retrieved from the receive buffer 1206 and operated on in a manner similar to subdecoder1. The 40 decoded samples resulting from each of these subdecoders are likewise sent to the transmit buffer 1207.

As indicated above, once a subdecoder has completed processing a subframe of GSM speech data by sending 40 decoded samples to the transmit buffer 1207, the transcoder 1200 can then, in steps 1308, 1317, 1327, and 1337, begin transmission of the received voice data bits from the transmit buffer 1207 concurrent with the decoding of the next subframe of voice data. By performing transmission prior to reception and decoding of the entire digital voice data frame, the delay inherent in the decoding process can be significantly reduced.

For example, the delay caused by the decoding process where the entire digital voice data frame is received prior to beginning transmission is, at a minimum, 20 ms (the length of time needed for complete reception). However, the delay caused by the decoding process according to the present invention is, for example, 92 bits/260 bits*20 ms=7 ms. This delay reduction helps reduce echo effects, and improves the overall characteristics of the mobile network.

A fifth exemplary embodiment of the present invention is a multi-channel TRAU/EC that uses the optimized decoding method previously described. This fifth exemplary embodiment of the present invention can be implemented, for example, in a four channel system, such as is shown by FIG. 11. The speech decoder 204 used by the RxDtx handler 202 is replaced by the decoder unit 1201.

This fifth exemplary embodiment can be implemented in a single DSP (according to the hardware architecture of FIG. 5). However, in order to run four completely independent (and therefore asynchronous) traffic channels in a single DSP multi-channel TRAU/EC, a scheduling of the functions to be performed by the DSP is required so that delay and/or data loss does not occur. For example, for each channel, the encoding, echo-cancellation, and decoding functions (including the running of the four subdecoders) must be performed within a 20 ms window to keep pace with the GSM data stream.

Figure 14:
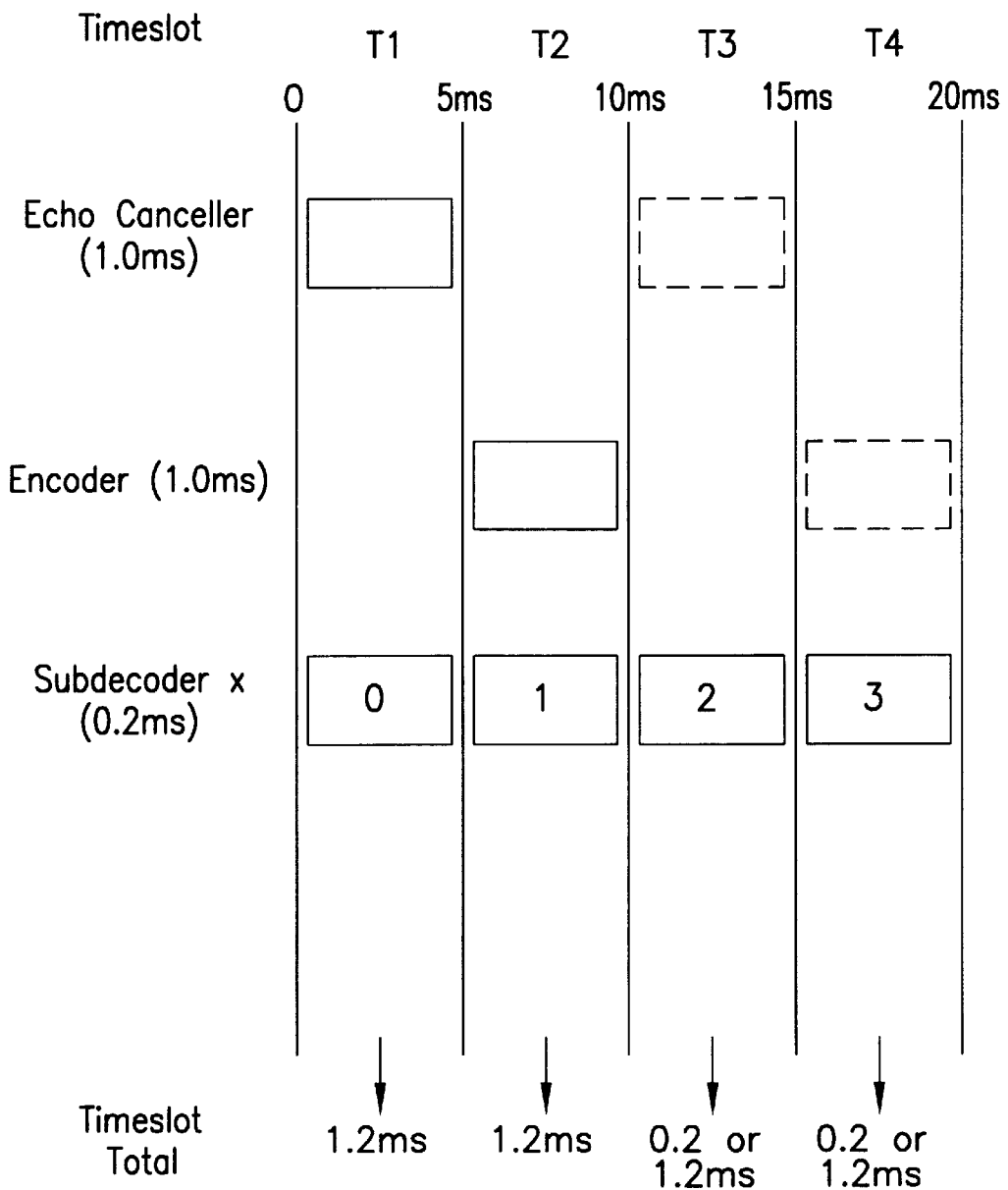
FIG. 14 shows a schedule of single channel software functions according to the present invention.

FIG. 14 shows functional diagram of an exemplary schedule for one of the four channels. While only a single channel schedule is illustrated, the schedule shown is otherwise similar for all other channels, as will be explained below.

As previously stated, every 20 ms the functions of the encoder, echo-canceller, subdecoder0, subdecoder1, subdecoder2, and subdecoder3 must be performed. Each of these functions requires a maximum amount of time to run. For example, in an Analog Devices 21062 DSP at 40 MHz, the encoder was measured to take 1.0 ms, a 32 taps echo-canceller was measured to take 1.0 ms, and each subdecoder required 0.2 ms. To accommodate these tolerances, the schedule is broken into four, 5 ms windows: T1; T2; T3; and T4. The functions to be executed by the DSP (also called "jobs") are scheduled so that a single channel uses no more than 1.2 ms of processing. As a result, functions can be performed on all four channels in each 5 ms window, since 1.2 ms×4=4.8 ms. The remaining time in each time window can be used for other functions, such as diagnostics.

For example, as shown in FIG. 14, in time window T1, an echo-canceller job and a subdecoder0 job can both be run for a single traffic channel (1.0 ms+0.2 ms=1.2 ms). In time window T2, an encoding job and a subdecoder1 job can both be run for a single traffic channel (1.0 ms+0.2 ms=1.2 ms). In time window T3, subdecoder2 can be run, and in time window T4, subdecoder3 can be run. Thus, all functions required to be executed for the traffic channel can be run within the 20 ms time frame, leaving ample time to execute similar operations for the other three traffic channels.

The exemplary schedule of the fifth exemplary embodiment also accounts for time alignment. As previously described, the C-bits in the decoder stream tell the decoder to speed up or slow down, creating a slew effect. Slewing is accommodated by the dashed boxes in the FIG. 14. If this process is needed, it is only allowed to run in time windows T3 or T4, since these time windows are underutilized. Note that, even with additional processing due to slew, the totals for each time slot never exceed 4.8 ms. Thus all four-channels can run asynchronously and maintain data integrity.

What is claimed is:

1. A transcoder unit having a rate adaption function and an echo-cancellation function, comprising: a single digital signal processor integrated circuit chip (DSP), the DSP having at least one input connected to at least one of a multi-channel near-end transmission line and a multi-channel far-end transmission line, and at least one output connected to at least one of the multi-channel far-end transmission line and the multi-channel near-end transmission line, wherein the DSP receives far-end input data from the multi-channel far-end transmission line at a first data rate, receives near-end input data from the multi-channel near-end transmission line at a second data rate, decodes the far-end input data to produce decoded far-end input data, performs an echo-cancellation operation on the near-end input data to produce echo-cancelled near-end input data, encodes the echo-cancelled near-end input data to produce encoded near-end input data, performs a near-end speech detection operation on the near-end input data and produces a first value (HCNTR) as a function of the presence of speech in the near-end input data, calculates a second value (INHIBIT) as a function of the far-end input data and the encoded near-end input data, performs training functions using the decoded far-end input data when the first value (HCNTR) is a first predetermined level and the second value (INHIBIT) is a second predetermined level, transmits the decoded far-end input data over the multi-channel near-end transmission line at the second data rate, and transmits the encoded near-end input data over the multi-channel far-end transmission line at the first data rate.

2. The transcoder unit of claim 1, wherein the multi-channel far-end transmission line connects to a GSM network.

3. The transcoder unit of claim 1, wherein the DSP boosts a signal level of the far-end input data during the step of performing training functions.

4. The transcoder unit of claim 1, wherein multiple traffic channels are processed by the transcoder unit.

5. The transcoder unit of claim 4, wherein four traffic channels are processed.

6. The transcoder unit of claim 1, wherein the far-end input data includes a frame of data bits, and the DSP, in decoding the far-end input data, (i) performs a first decoding operation to decode a first subframe of the frame of data bits to produce a first group of decoded data bits;

(ii) initiates the transmission of the first group of decoded data bits; and (iii) performs a second decoding operation to decode a second subframe of the frame of data bits to produce a second group of decoded data bits, wherein the second decoding operation is performed during the transmission of the first group of decoded data bits.

7. The transcoder unit of claim 6, wherein the DSP (iv) initiates a transmission of the second group of decoded data bits;

(v) performs a third decoding operation in the transcoder unit to decode a third subframe of the frame of data bits to produce a third group of decoded data bits, wherein the third decoding operation is performed during the transmission of the second group of decoded data bits;

(vi) initiates a transmission of the third group of decoded data bits; and (vii) performs a fourth decoding operation in the transcoder unit to decode a fourth subframe of the frame of data bits to produce a fourth group of decoded data bits, wherein the fourth decoding operation is performed during the transmission of the third group of decoded data bits.

8. The transcoder unit of claim 6, wherein a plurality of traffic channels are processed by the transcoder unit.

9. The transcoder unit of claim 8, wherein the DSP schedules the occurrence of the decoding, encoding, and echo-cancellation operations for each of the plurality of traffic channels processed by the transcoder unit.

10. The transcoder unit of claim 9, wherein the DSP performs time alignment in scheduling.

* * * * *